US009642487B1

(12) United States Patent
McGinn

(10) Patent No.: US 9,642,487 B1
(45) Date of Patent: *May 9, 2017

(54) PORTABLE CAN COOKER APPARATUS AND METHOD

(71) Applicant: Seth D. McGinn, Omaha, NE (US)

(72) Inventor: Seth D. McGinn, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,913

(22) Filed: Dec. 22, 2015

Related U.S. Application Data

(63) Continuation-in-part of application No. 14/263,525, filed on Apr. 28, 2014, now Pat. No. 9,254,057, which is a continuation of application No. 13/649,518, filed on Oct. 11, 2012, now Pat. No. 8,747,933, which is a continuation-in-part of application No. 12/914,374, filed on Oct. 28, 2010, now abandoned, which is a continuation-in-part of application No. 12/191,072, filed on Aug. 13, 2008, now abandoned.

(60) Provisional application No. 60/964,951, filed on Aug. 17, 2007.

(51) Int. Cl.
*A47J 27/04* (2006.01)

(52) U.S. Cl.
CPC .......... *A47J 27/04* (2013.01); *A47J 2027/043* (2013.01)

(58) Field of Classification Search
CPC ........ A01K 97/05; B65D 45/16; B65D 45/18; B65D 45/22; B65D 45/24; A47J 27/08; A47J 27/0804; A47J 27/0813; A47J 27/0817; A47J 27/082; A47J 27/09; A47J 36/06; A47J 36/08; A47J 36/10; A47J 36/16; A47J 36/20; A47J 37/0786

USPC .... 220/200, 319, 320, 324, 378, 569, 573.1, 220/573.4–573.5, 912; 215/273, 280, 215/286, 289; 219/440; 99/337, 340, 99/359, 403; D7/601, 612, 615
See application file for complete search history.

(56) References Cited

U.S. PATENT DOCUMENTS

| 1,082,783 | A | | 12/1913 | Werner | |
|---|---|---|---|---|---|
| 1,941,337 | A | | 12/1933 | Cato et al. | |
| 2,462,728 | A | * | 2/1949 | Debs | A21B 3/133 126/390.1 |
| 2,507,444 | A | | 5/1950 | Kear | |
| 2,565,269 | A | | 8/1951 | Saxton | |
| 2,828,045 | A | | 3/1958 | Vischer, Jr. | |
| 4,401,017 | A | | 8/1983 | Feld | |
| 4,541,411 | A | * | 9/1985 | Woolf | A47J 36/02 220/573.2 |

(Continued)

*Primary Examiner* — J. Gregory Pickett
*Assistant Examiner* — Brijesh V. Patel
(74) *Attorney, Agent, or Firm* — Hamilton IP Law, PC; Jay R. Hamilton; Charles A. Damschen

(57) ABSTRACT

A can cooker includes a main body that is generally cylindrical in shape having a bottom portion, wall portion, neck portion, and lid ring. The bottom portion, wall portion, and neck portion may be integrally formed and connected to one another. A lid is sized and shaped to fit within a part of the neck portion. The lid includes an outer lip that engaged with lid ring on the main body in such a way that a seal is formed between the lid ring and the outer lip. Handles may be placed on the exterior surface of the lid and main body to ease use and transportation of the can cooker. An interior portion of the main body may be formed with an interior coating and an exterior portion of the main body may be formed with an exterior coating.

20 Claims, 12 Drawing Sheets

(56) References Cited

U.S. PATENT DOCUMENTS

| | | | |
|---|---|---|---|
| 4,982,864 A | 1/1991 | Kusta | |
| D381,872 S | 8/1997 | Lin | |
| 5,715,743 A | 2/1998 | Goddard | |
| 5,826,494 A | 10/1998 | Wang | |
| 6,360,423 B1* | 3/2002 | Groll | A47J 36/02 220/573.1 |
| 6,360,654 B1 | 3/2002 | Cornfield | |
| 6,431,385 B1 | 8/2002 | Palmer | |
| 6,450,361 B1 | 9/2002 | Mendelson et al. | |
| 6,718,966 B1 | 4/2004 | Barbour | |
| 2004/0154478 A1 | 8/2004 | Thein et al. | |
| 2004/0216620 A1 | 11/2004 | Quiggins et al. | |
| 2008/0142526 A1* | 6/2008 | Cheng | A47J 36/025 220/573.1 |
| 2010/0108690 A1* | 5/2010 | Groll | A47J 36/02 220/573.1 |

* cited by examiner

PORTABLE CAN COOKER APPARATUS AND METHOD

CROSS REFERENCE TO RELATED APPLICATIONS

Applicant states that this utility patent application is a continuation-in-part of and claims priority from U.S. patent application Ser. No. 14/263,525 filed on Apr. 28, 2014 which was a continuation of and claimed priority from U.S. patent application Ser. No. 13/649,518 filed on Oct. 11, 2012, which is a continuation-in-part of and claims priority from U.S. patent application Ser. No. 12/914,374 filed on Oct. 28, 2010, which application was a continuation-in-part of and claimed priority from U.S. patent application Ser. No. 12/191,072 filed on Aug. 13, 2008, which application claimed priority from provisional U.S. Pat. App. No. 60/964,951 filed on Aug. 17, 2007, all of which are incorporated by reference herein in their entireties.

FIELD OF THE INVENTION

The apparatus described herein is generally applicable to the field of cooking and cookware. The embodiments shown and described herein are more particularly for an improved method and apparatus for cookware allowing the simultaneous preparation and cooking of a plurality of ingredients.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.71 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

Figure 1:
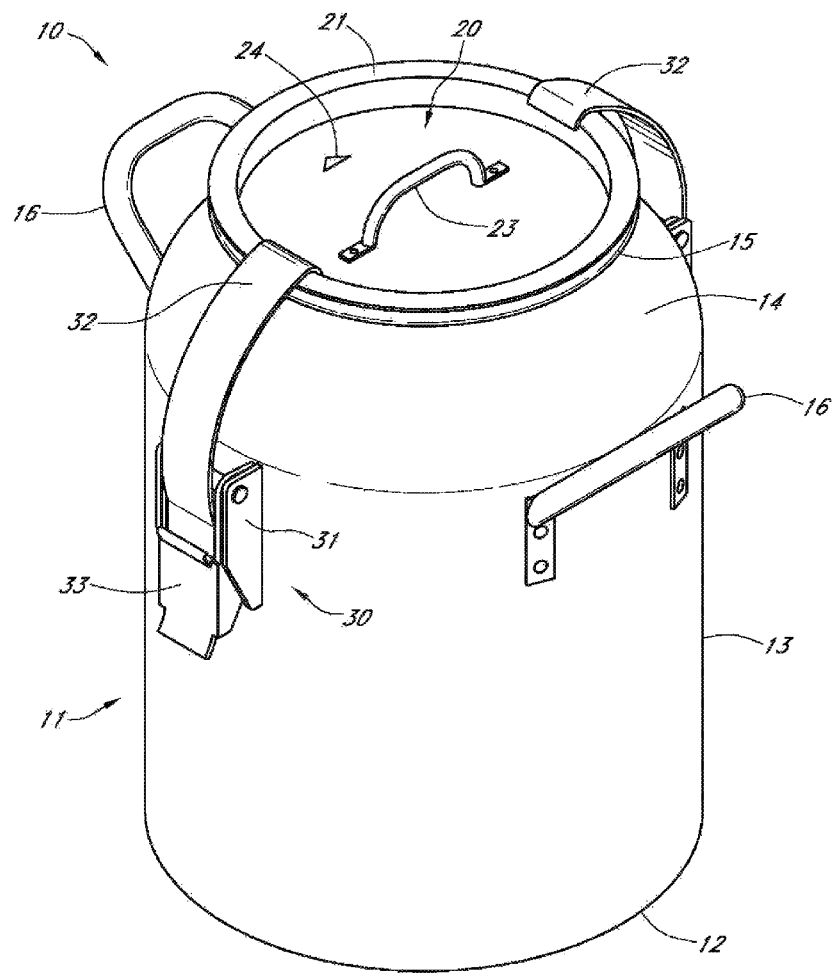
FIG. 1 is a perspective view of the can cooker with the lid installed and the gasket removed.

| DETAILED DESCRIPTION - LISTING OF ELEMENTS | |
|---|---|
| Element Description | Element Number |
| Aperture | 8 |
| Can cooker | 10 |
| Main body | 11 |
| Bottom portion | 12 |
| Wall portion | 13 |
| Neck portion | 14 |
| Lid ring | 15 |
| Handle | 16 |
| Lid | 20 |
| Outer lip | 21 |
| Recessed portion | 22 |
| Lid handle | 23 |
| Vent | 24 |
| Gasket | 25 |
| Latch | 30 |
| Latch base | 31 |
| Lid engaging portion | 32 |
| Clip | 33 |
| Grate system | 40 |
| Grate piece | 41 |
| Cross bar | 42 |
| Supporting cross bar | 44 |
| Foot | 44a |
| Periphery bar | 46 |
| Basket | 50 |
| Basket handle | 52 |
| Basket lip | 54 |
| Strainer lid | 60 |
| Interior coating | 70 |
| Exterior coating | 72 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION OF INVENTION

First Illustrative Embodiment

Figure 2:
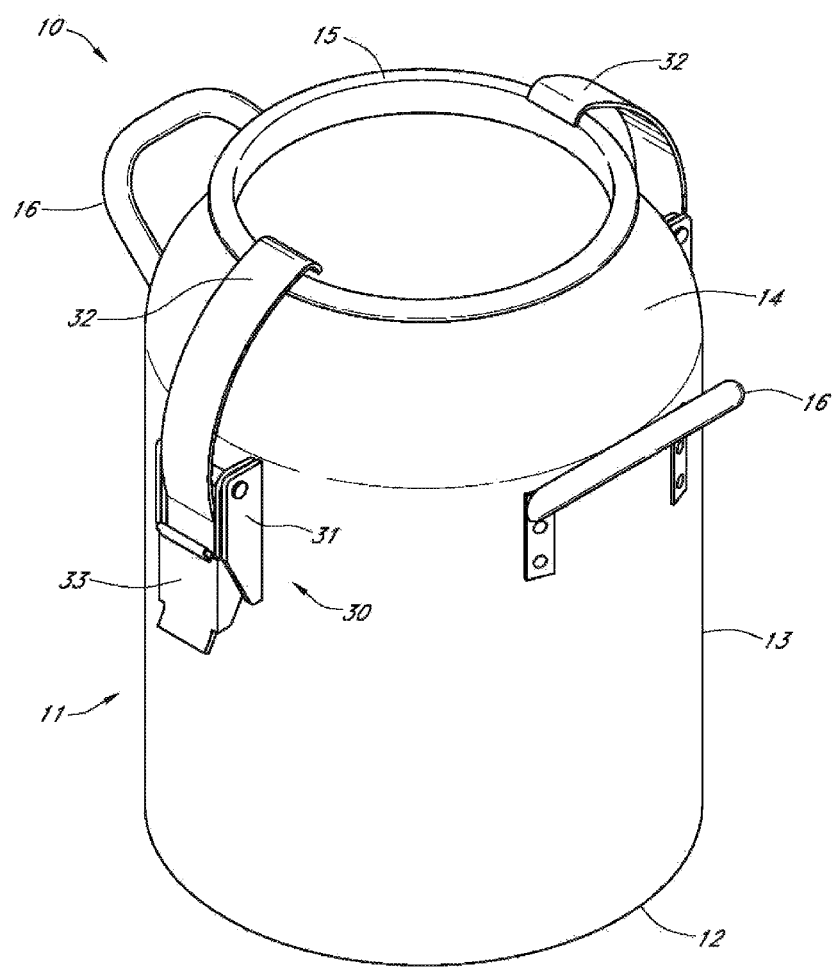
FIG. 2 is a perspective view of the can cooker with the lid removed.
Figure 3:
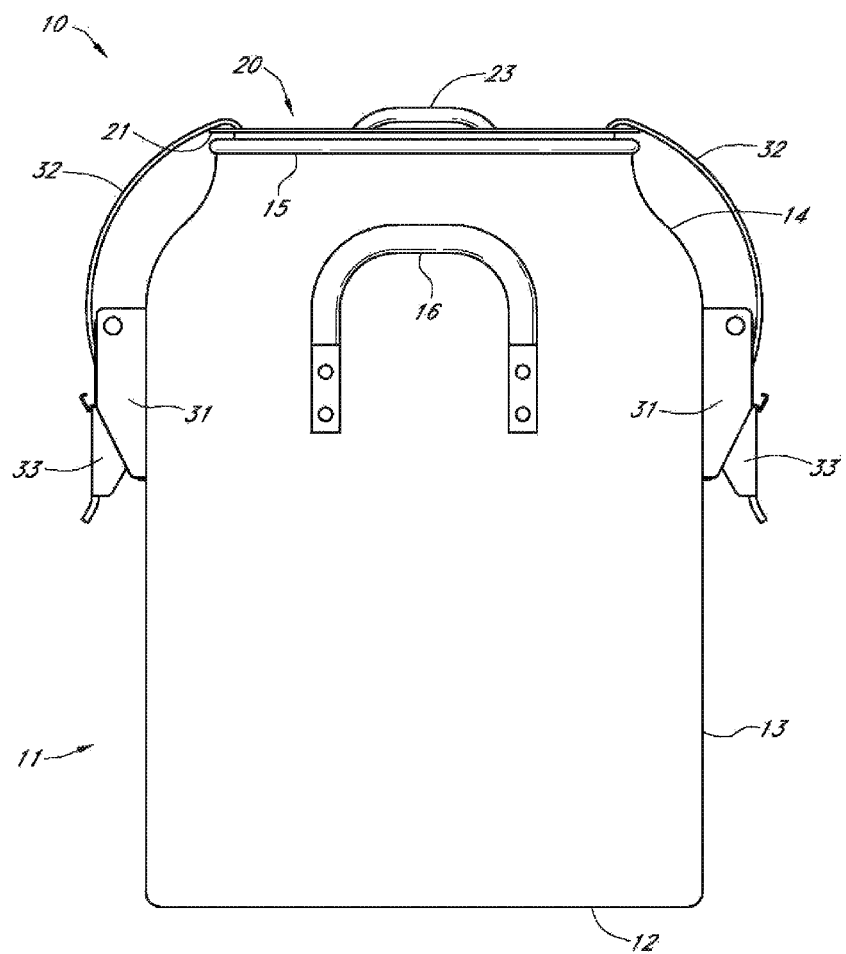
FIG. 3 is a side view of the can cooker with the lid installed and the gasket removed.

Referring now to the drawings, wherein like reference numerals designate identical or corresponding parts throughout the several views, FIG. 1 provides a perspective view of the can cooker 10. The most prominent feature of the can cooker 10 is the main body 11. The main body 11 is a hollow, generally cylindrical structure. A wall portion 13 forms the side of the cylindrical structure and a bottom portion 12 closes the bottom end of the main body. At the top of the main body 12, the circumference of the main body 12 decreases through the neck portion 14, which terminates at a lid ring 15. The cross-sectional shape of the main body 11 is constant along its length (i.e., circular), but the size is not constant, as is best shown in FIG. 2. The periphery of the main body 11 at the wall portion 13 is greater than the periphery at the neck portion 14. The lid ring 15 is positioned at the uppermost edge of the neck portion 14, which is open to the interior of the can cooker 10.

The main body 11 is formed as one seamless, unitary structure. That is, the bottom portion 12, wall portion 13, and neck portion 14 are integrally connected with one another to form a seamless main body 11. Additionally, the lid ring 15 may be integrally formed with the other elements of the main body 11. It is contemplated that the main body 11 may be constructed of a relatively high quality aluminum, such as 1060 grade. Alternatively, the lid ring 15 may be constructed of a different material and not integrally formed with the main body 11, but instead affixed thereto after fabrication of the main body 11. It is contemplated that the main body 11 and several elements thereof will be constructed of aluminum or an aluminum alloy, but other material suitable for the specific application (such as steel, iron, stainless steel, etc.) may be used without departing from the spirit and scope of the can cooker 10.

Affixed to the exterior surface of the wall portion 13 is a plurality of handles 16. In the illustrative embodiment pictured herein, the can cooker 10 includes two handles 16 spaced apart by 180 degrees. However, other arrangements and orientations of handles 16 may be used with the can cooker 10 without departing from the spirit and scope of the can cooker 10.

Figure 4:
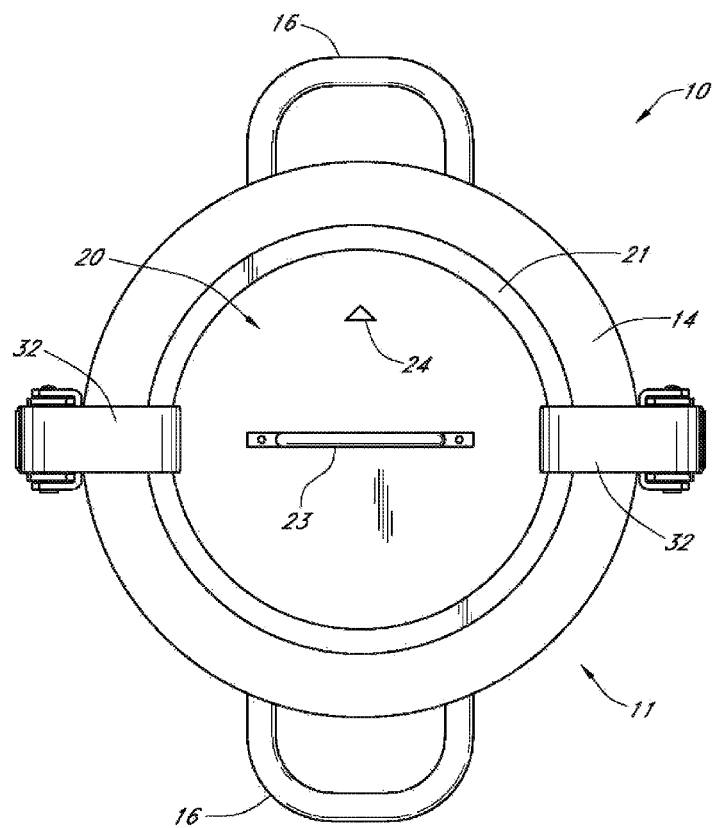
FIG. 4 is a top view of the can cooker with the lid installed.
Figure 5A:
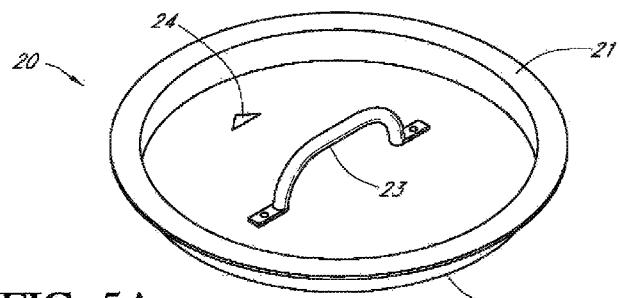
FIG. 5A is a perspective view of the lid.
Figure 5B:
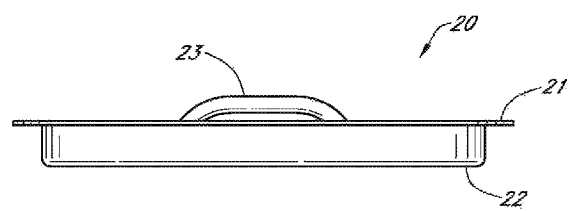
FIG. 5B is a side view of the lid.
Figure 5C:
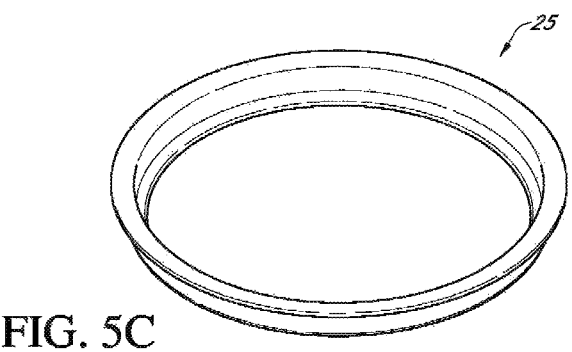
FIG. 5C is a perspective view of the gasket.
Figure 6:
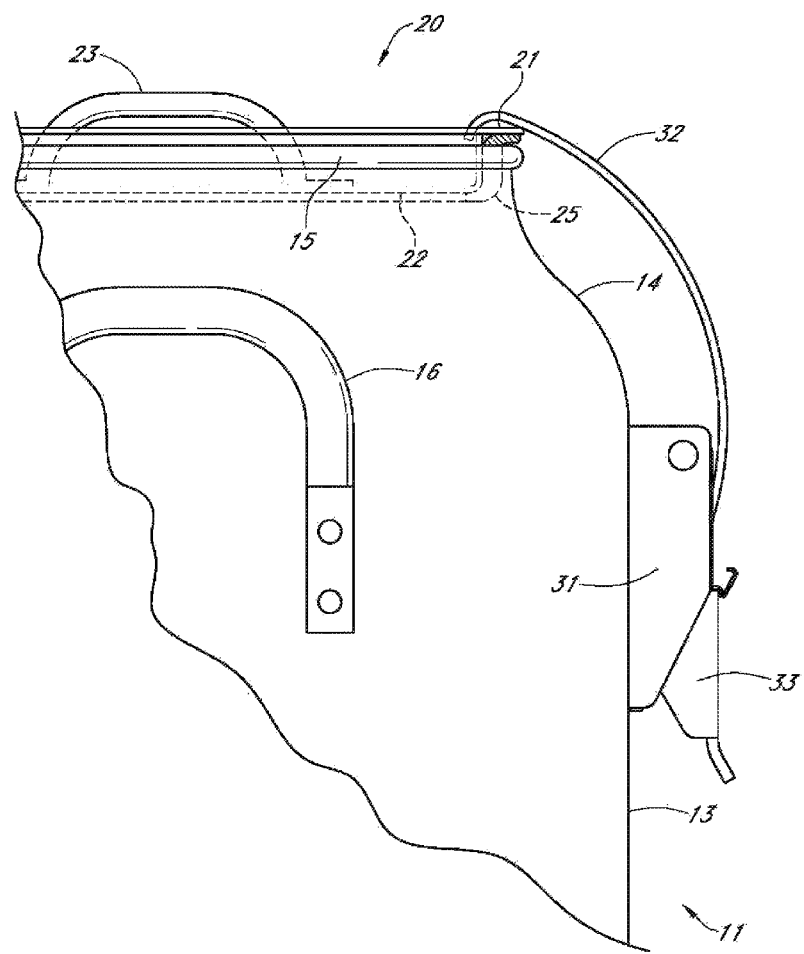
FIG. 6 is detailed side view of the neck portion of the can cooker with the lid and a gasket installed.

FIG. 5A provides a perspective view of the lid 20. The can cooker 10 is shown in FIGS. 1, 3, 5, and 6 with the lid 20 installed. FIG. The lid 20 includes an outer lip 21, which is integrally formed with and connected to a recessed portion 22. The recessed portion 22 is formed as a very short cylinder having one end thereof closed, which is best shown in the side view of the lid 20 in FIG. 5B. The recessed portion 22 is sized and shaped so that it seats within the upper-part of the neck portion 14, as shown in FIG. 6. The outer lip 21 is sized and shaped so that it is engageable with the lid ring 15, also shown in FIGS. 4 and 6. In FIG. 6, the hidden lines represent the part of the lid 20 seated within the neck portion 14 below the lid ring 15. The engagement of the outer lip 21 and the lid ring 15 provides the primary seal between the lid 20 and the main body 11. A lid handle 23 is affixed to the exterior surface of the lid 20 to ease removal and installation thereof. A vent 24 is also formed in the recessed portion 22 of the lid 20 to allow steam to exit the interior of the can cooker 10 during use (described in detail below).

The vent 24 in the embodiments pictured herein is simply formed as an aperture in the lid 20, but other vents 24 may be used that consist of an aperture and other structure without departure from the spirit and scope of the can cooker 10. For example, a vent 24 comprised of an aperture in the lid 20 and a lifting portion that indicates when it is in the open position may be used. This type of vent 24 would alert the user when steam was being formed inside the cooker 10.

In certain embodiments, a gasket 25 may be positioned between certain portions of the lid 20 and the neck portion 14 to seal the interior of the main body 11 from the exterior environment. FIG. 5C shows one embodiment of the gasket 25. The gasket 25 may be configured so that if the pressure inside the main body 11 reaches a certain level, vapors and/or gases may exit the interior of the main body 11 between either the lid 20 and the gasket 25 or the neck portion 14 and the gasket 25. Embodiments using a gasket 25 may also use a vent 24 formed in the lid 20 as shown in FIG. 1. The gasket 25 may be constructed of any suitable material, including but not limited to a high-temperature silicon.

The lid 20 may be held to the main body 11 with any suitable securing mechanism. The illustrative embodiment uses a plurality of latches 30 as a securing mechanism. However, other embodiments not pictured herein may use circular or semi-circular clamps, screws, bolts, a weight positioned on the lid 20, and/or any other suitable securing mechanism.

The illustrative embodiment pictured herein includes two latches 30 evenly spaced between the two handles 16 on the main body 11; however, other arrangements and orientations of handles 16 may be used with the can cooker 10 without departing from the spirit and scope of the can cooker 10. Each latch 30 is of the type well known to those skilled in the art and includes a latch base 31, a lid engaging portion 32, and a clip 33. The latch base 31 is affixed to the exterior surface of the wall portion 13. A clip 33 is pivotally connected to the base 31, and a first end of the lid engaging portion 32 is pivotally connected to the clip 33. The second end of the lid engaging portion 32 is fashioned to engage and secure the lid 20. The clip 33 is positionable in a closed position, wherein the clip 33 is substantially flush with the latch base 31, as shown in FIGS. 1, 3, 4, and 6. The open position, shown in FIG. 2 releases the lid engaging portion 32 from the lid 20 so that the lid 20 may be removed from the main body 11. Other means of securing the lid 20 to the main body 11 known to those skilled in the art may be used without departing from the spirit and scope of the can cooker 10.

In another embodiment not pictured herein, a locking collar (not shown) may be used to secure the lid 20 to the main body 11. The locking collar (not shown) is hinged on one end and has a cinching clamp on the opposite end. The locking collar (not shown) is formed with a curved or angled cross section so that it fits around the lid ring 15 and outer lip 21 so that the lid 20 is secured to the lid ring 15 (an consequently the main body 11) by the locking collar (not shown). Embodiments employing a locking collar (not shown) may also use a gasket 25 similar to the type described above for use in embodiments not employing a locking collar (not shown).

The can cooker 10 may also be used with a grate system 40. Generally, a grate system 40 may ensure that solid food material positioned within a can cooker 10 is spaced from the interior of the can cooker 10 and not positioned within any liquid placed in the can cooker 10 if desired. This ensures that food material in the can cooker 10 is cooked with steam and/or through conduction and/or convection. This allows the can cooker 10 to be used with any heat source, including but not limited to stove top, gas and/or charcoal grill, turkey/fish fryer burner, campfire/open flame, and/or combinations thereof.

Figure 7A:
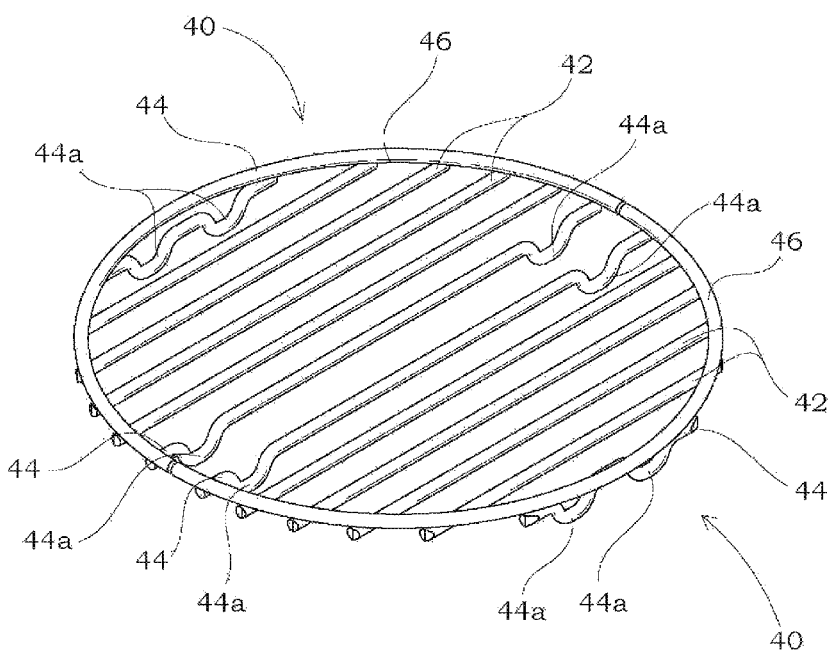
FIG. 7A is a perspective view of one embodiment of a grate system that may be used with the can cooker.
Figure 7B:
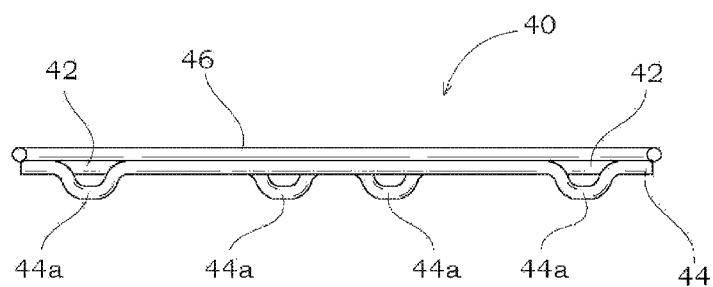
FIG. 7B is a side view of one embodiment of a grate system that may be use with the can cooker.
Figure 8:
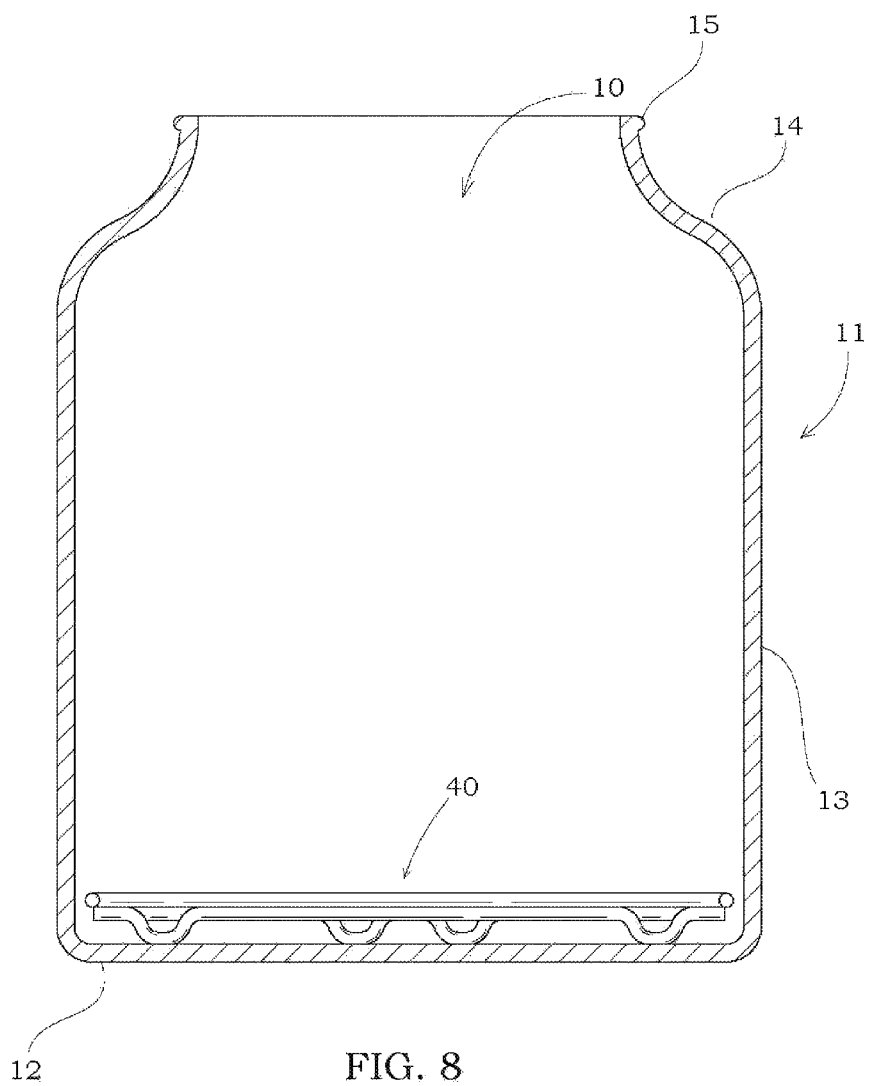
FIG. 8 is a cross-sectional view of one embodiment of a can cooker with a grate installed wherein the handles, latches, and lid have been removed for purposes of clarity.

A perspective view of one embodiment of a great system 40 is shown in FIG. 7A. The pictured embodiment of a grate system 40 is comprised of two mirror-image grate pieces 41 as shown in FIG. 7A, a side view of which is shown in FIG. 7B. In the pictured embodiment of the grate system 40, each grate piece 41 is formed substantially as a half-circle, and two grate pieces 41 may be used to fully cover in the interior bottom portion 12 of the can cooker 10. In other embodiments of the grate system 40, the grate pieces 41 may be formed differently.

Each grate piece 41 may be formed with a periphery bar 46 extending around the outer, curved edge, as shown in FIG. 7A. A plurality of cross bars 42 may be affixed at each end thereof to the periphery bar 46. In the pictured embodiment, each grate piece 41 includes two support cross bars 44—one at either end of the grate piece 41. Each support cross bar 44 may be formed with at least one foot 44a therein. The pictured embodiment includes two feet 44a formed in each supporting cross bar 44. Each foot 44a interfaces the interior bottom portion 12 of the can cooker 10 so that the cross bars 42 are spaced from the interior bottom portion 12 by an amount approximately equal to the height of the feet 44a. The specific height of each foot 44a may vary from one embodiment to the next, and therefore in no way limits the scope of the can cooker 10, but it is contemplated that for most applications the height will be between 0.5 and 4 inches. Each foot 44a may be integrally formed with the supporting cross bar 44, or may be separately fabricated and later attached thereto. Any method and/or structure may be used to affixed the respective cross bar 42 and/or supporting cross bar 44 to the periphery bar 46, including but not limited to mechanical fasteners, chemical adhesives, welding, and/or combinations thereof.

In another embodiment of the can cooker 10 not pictured herein, the grate pieces 41 are not formed with feet 44a in the supporting cross bars 44. Instead, the interior surface of the wall portion 13 is formed with a plurality of shelves (not shown) spaced about the periphery of the can cooker 10 interior. Accordingly, each grate piece 41 may be configured so that it rests on at least one of these shelves. The shelves may be configured so that each grate piece 41 is spaced from the bottom portion 12 by a predetermined amount. Furthermore, the shelves may be configured such that one grate piece 41 is closer to the bottom portion 12 that another grate piece 41 so that the cooking time for material positioned on each respective grate piece 41 is different. The grate system 40 may be constructed of any suitable material for the particular application of the can cooker 10 without limitation. Such suitable materials include but are not limited to metal, metal alloys, high-temperature polymer materials, and/or combinations thereof.

Figure 9:
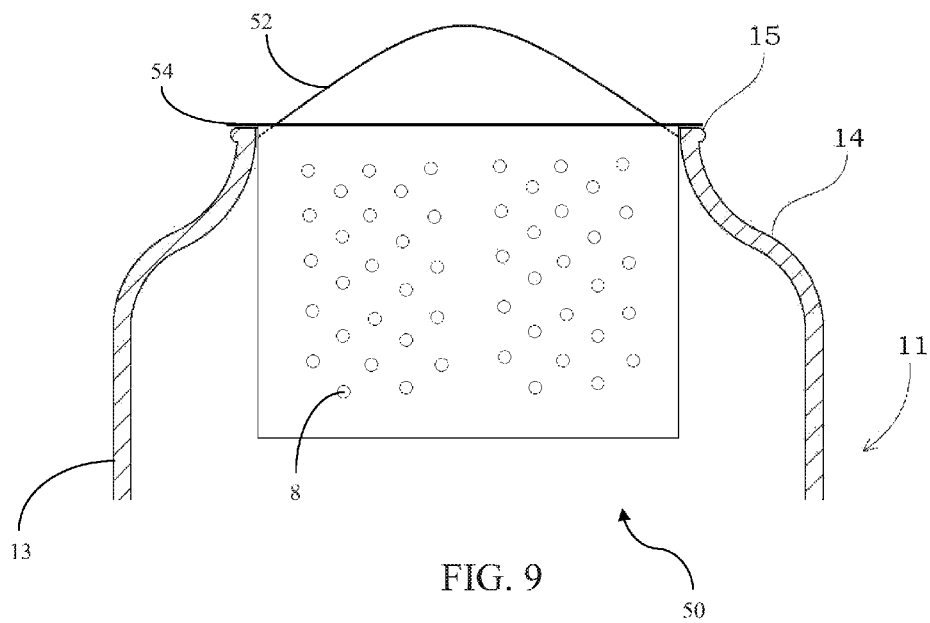
FIG. 9 is a cross-sectional view of one embodiment of a can cooker with a basket installed wherein the handles, latches, and lid have been removed for purposes of clarity.

Another embodiment of a can cooker 10 is shown in FIG. 9, which provides a cross-sectional view of an upper portion of the main body 11. As shown, this embodiment may include a basket 50 positioned within the interior of the main body 11. The basket 50 may be generally cylindrical in shape with a basket lip 54 extending from the top periphery. The basket lip 54 may be configured so that the weight of the basket 50 and any contents positioned therein may be supported by the basket lip 54 when the basket lip 54 rests on the lid ring 15 of the main body 11, as shown in FIG. 9. Additionally, the basket 50 may include a basket handle 52 pivotally engaged with the basket 50 to ease removal and/or installation of the basket 50 within the main body 11. The basket handle 52 may be configured such that it fits within the lid ring 15 and basket lip 54 when not use so that the lid 20 fits securely on the main body 11 regardless of whether the basket 50 is positioned within the main body 11. Additionally, the basket may be formed with supporting feet (not shown) to provide additional support and/or rigidity to the basket 50 during use. If such supporting feet are used, the basket lip 54 may not be required to adequately support the basket 50.

Figure 10:
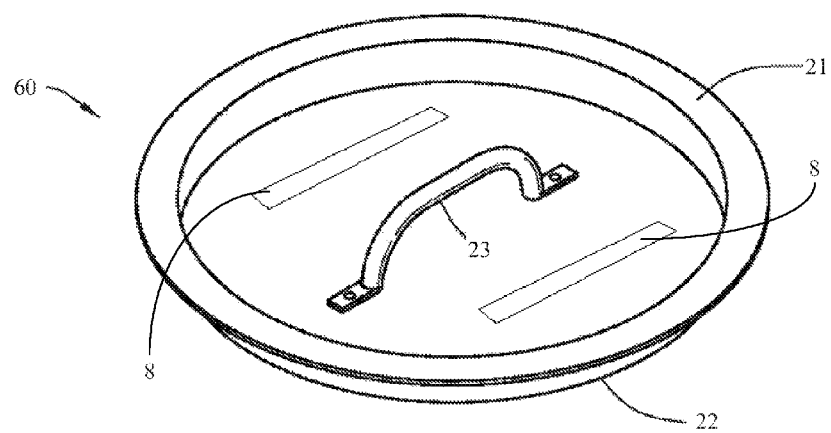
FIG. 10 is a perspective view of another embodiment of a lid that may be used with certain embodiments of the can cooker.

Another embodiment of a lid 20 is shown in FIG. 10 as a strainer lid 60. The strainer lid 60 may be configured generally similar to the lid 20 shown in FIGS. 5A & 5B in having an outer lip 21, recessed portion 22, and lid handle 23. Additionally, the strainer lid 60 may be secured to the main body 11 using the latches 30 as previously described for the lid 20 above. However, the strainer lid 60 may also include one or more apertures 8 formed in the recessed portion 22. The strainer lid 60 allows liquid within the main body 11 to be removed without removing the strainer lid 60 from the main body 11.

The basket 50 may allow the user to suspend contents above any liquid in the bottom of the main body 11. Such a configuration may allow all of the food within the can cooker 10 to be positioned above the liquid so that it is cooked via steaming instead of boiling, which may allow retention of more nutrients, colors, and flavors. However, a user may add additional liquid to the can cooker 10 such that contents within the basket 50 are submerged by the liquid, which may be desirable for certain applications of the can cooker 10 (e.g., cooking crab, crayfish, corn on the cob, and/or low country boil). Additionally, the liquid could be an oil for frying/broasting/braising within the can cooker 10.

The basket 50 may also allow a user to remove food from the can cooker 10 when that food is finished cooking with minimal liquid loss if other food within the can cooker 10 is not yet fully cooked. For example, if the grate system 40 and basket 50 are used in combination, a user may position food requiring a relatively longer cooking time (e.g., potatoes, carrots, etc.) on the grate system 40 and food requiring a relatively shorter cooking time (i.e., shrimp, peas, etc.) in the basket 50. The user may remove the basket 50 (thereby removing the food positioned in the basket 50) with minimal loss of liquid, and subsequently reposition the lid 20 on the main body 11 to continue cooking food positioned on the grate system 40. In this manner, the can cooker 10 may be used to prepare foods requiring disparate cooking times within the same apparatus and using the same liquid with minimal/no disruption to cooking time. At any point a portion of the liquid may be removed from the can cooker 10 for another use (e.g., to prepare a rue, gravy, etc.). A strainer lid 60 may ease the process of removing a portion of the liquid within the can cooker 10 and retaining a portion of the liquid inside the can cooker 10.

The grate system 40 may also allow a user to cook certain contents in the can cooker 10 primarily using steam and other contents primarily via boiling by positioning contents above and below the cross bars 42, respectively, and adjusting the level of liquid within the can cooker 10 so that it does not rise above the cross bars 42. However, in many applications, the basket 50 may allow the contents cooked primarily by steam to be removed more easily and increase the amount of liquid retained in the can cooker.

When using the can cooker 10 with a grate system 40 and without a basket 50, it is contemplated that the user may install the strainer lid 60 after a portion and/or all of the food within the can cooker 10 has fully cooked and remove the liquid through the apertures 8. A user may drain the liquid into a first container, then remove the food from the grate system and place it in a second container. The user may then place a portion of the liquid back into the can cooker 10 for additional cooking and/or use a portion thereof to prepare a rue, gravy, etc.

The can cooker 10 may use steam to create a convection cooking environment within the can cooker 10 with that steam. Accordingly, the can cooker 10 may offer minimal leaching of flavors, colors, etc. This steam convection cooking environment is different from the cooking environment within a slow cooker, which uses slow conduction heat (the heat source is external to the food cooking chamber, and the food cooking chamber dissipates the heat slowly from the outside inward, thereby blending the colors, flavors, textures together). This steam convection cooking environment also differs from boiling, which leeches colors and nutrients from you meats and vegetables into the liquid.

Whether using the grate system 40 or the basket 50, the liquid may be positioned under the food. Because of the heat transfer properties of FDA grade aluminum (which may be 1060 FDA grade in one embodiment of the can cooker 10) certain embodiments of the can cooker 10 may be used to cook a large amount of food on a relatively low-output heat source in a relatively short amount of time.

By placing the can cooker 10 adjacent a heat source, the user may cause a portion of the liquid in the main body 11 to be converted to steam. For many applications, it may be desirable to position the heat source adjacent the bottom portion 12 and/or a part of the wall portion 13 adjacent the bottom portion 12, but the heat source may be positioned in other places without limitation. With the lid 20 in place, the steam may rise and encapsulate all or some of the contents in the main body 11. The neck portion 14 between the lid ring 15 and wall portion 13 provides a direct place for steam to condense and fall back toward the bottom portion 12 (i.e., to where the heat source is located when heated adjacent the bottom portion 12) in the liquid phase. Alternatively, or in conjunction, the steam may condense on the food within the can cooker 10. Accordingly, in either event, the liquid may be recycled within the can cooker 10 during use.

The gasket 25 and lid 20 also may serve to facilitate this steam convection cooking environment, because in the illustrative embodiment the gasket 25, lid 20, and lid ring 15 are configured such that steam, gas, and/or other vapor will preferably exit the main body via the vent 24 formed in the lid 20 rather than between the lid 20 and gasket 25 and/or main body 11 and gasket 25. Furthermore, because the illustrative embodiment of the main body 11 is constructed of one unitary piece, there are no seams or other weak points in the main body 11 that may be of suspect integrity. A unitary design also ensures even heat transfer because of the uniformity of the wall portion 13. In other embodiments, the main body 11 may be constructed of two or more separate pieces that are later joined together (e.g., the The gasket 25, lid 20, and lid ring 15 may also be configured so that if the conditions within the can cooker 10 are such that the vent 24 unduly restricts the flow of material out of the can cooker 10, steam, vapor, and/or liquid may seep from an area between the lid 20 and the gasket 25 and/or an area between the gasket 25 and main body 11. Such a configuration may allow leakage at any predetermined pressure within the can cooker 10.

In some applications, approximately 65% of the steam produced within the can cooker 10 will condense on the neck portion 14 and return to any area near the bottom portion 12 as liquid (either by dripping or by flowing down the wall portion 13). When the user has placed liquid and food within the can cooker 10 to prepare for cooking the food, and when can cooker 10 is positioned adjacent to a heat source, the neck portion 14 allows a user to remove the lid 20 without releasing more than a nominal amount of vapor because the majority of the vapor in the main body 11 may condense on the interior of the neck portion 14 due to the reducing diameter thereof.

Second Illustrative Embodiment

Figure 11:
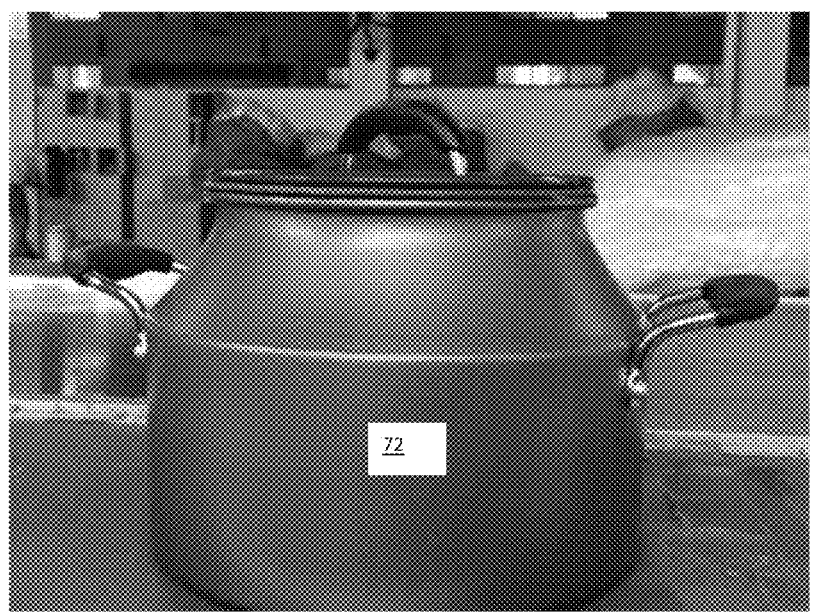
FIG. 11 is a front perspective view of other aspects of a can cooker.
Figure 12:
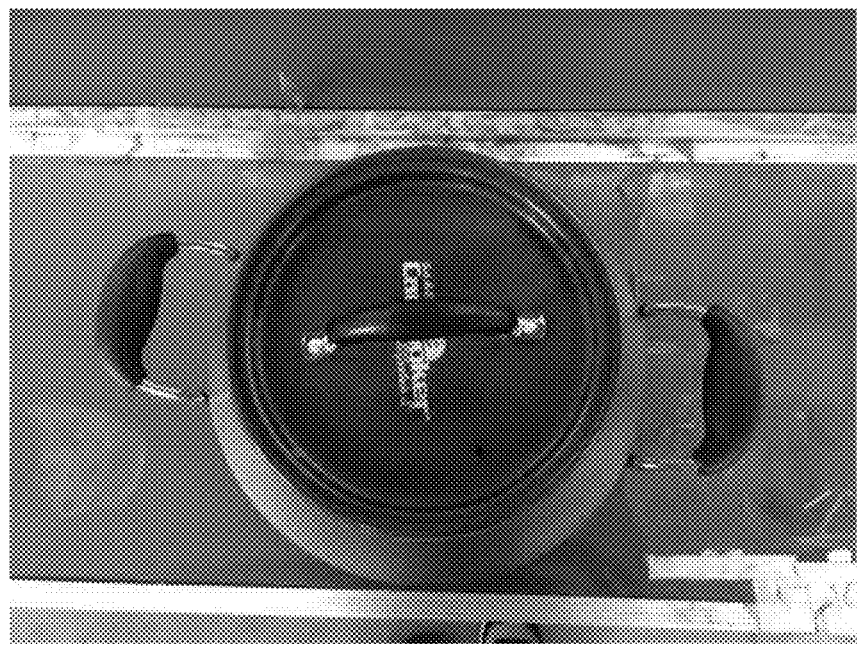
FIG. 12 is a top view of the can cooker shown in FIG. 11.
Figure 13:
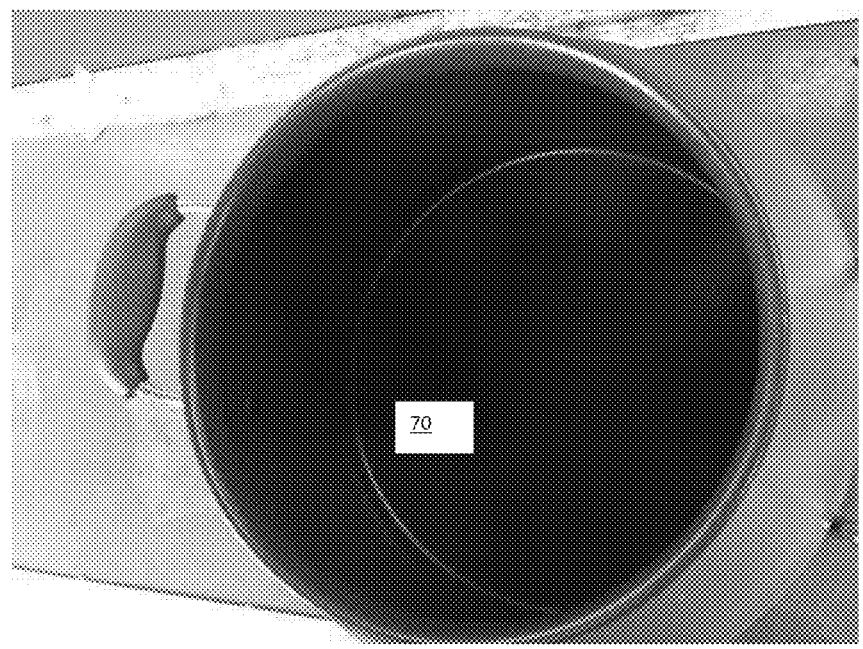
FIG. 13 is a top view of the can cooker shown in FIGS. 11 & 12 with the lid removed.

Other aspects of a can cooker 10 are shown in FIGS. 11-13. The can cooker 10 shown in these figures generally may provide the various features and/or functionality of other can cookers 10 disclosed herein. In an aspect shown in FIGS. 11-13, the can cooker 10 may be configured without latches 30 employed to secure the lid 20 to the main body 11 of the can cooker 10. In such an aspect, the force of gravity on the lid 20 may be sufficient to adequately secure the lid 20 with the main body 11. Alternatively, an exterior weight may be positioned on top of the lid 20 to secure the position of the lid 20 as needed. However, the scope of the present disclosure is in no way limited by the structure and/or method employed to engage the lid 20 with the main body 11 unless so indicated in the following claims.

As clearly shown in at least FIG. 11, an exterior portion of the can cooker 10 may be configured with an exterior coating 72. Both the main body 11 and the lid 20 may be configured with the exterior coating 72. The optimal type of exterior coating 72 will vary at least depending on the material from which the can cooker 10 is constructed. For example, if the can cooker 10 is constructed of stainless steel, paint and/or colored enamel may be used as an exterior coating 72. In another aspect, if the can cooker 10 is constructed of aluminum, the can cooker may be anodized. It is contemplated that the exterior coating 72 may provide different colors and/or patterns for the exterior of the can cooker 10. Accordingly, the scope of the present disclosure is in no way limited by the method and/or structure used for the exterior coating 72 unless so indicated in the following claims.

As clearly shown in at least FIG. 13, an interior portion of the can cooker 10 may be configured with an interior coating 70. Both the main body 11 and the lid 20 may be configured with the interior coating 70. The optimal type of interior coating 70 will vary at least depending on the material from which the can cooker 10 is constructed. In one aspect, the interior coating 70 may be non-stick, including but not limited to polytetrafluoroethylene. In another aspect, the interior coating 70 may be other than a non-stick coating. In still another aspect, the interior coating 70 may be configured as a ceramic. It is contemplated that the interior coating 70 may provide different colors, properties, and/or functionality to an interior of the can cooker 10. Accordingly, the scope of the present disclosure is in no way limited by the method and/or structure used for the interior coating 70 unless so indicated in the following claims.

Illustrative Method of Use

One method of using the can cooker 10 will now be disclosed. The can cooker 10 may be used to cook vegetables and/or meat if an external heat source (such as a propane heater, camp fire, stove top, etc.) is present. The food to be cooked is loaded into the interior of the can cooker 10 through the lid ring 15 and neck portion 14 into the interior of the main body 11. Examples of food to be cooked includes corn, onions, potatoes, broccoli, asparagus, cauliflower, beets, or other vegetables, sausage, frankfurters, pork, beef, chicken, wild game, or other meat, and seasoning agents, such as salt, pepper, spices, or herbs. Texturing ingredients, such as olive oil, butter, or margarine, may also be used if desired. The amount of food that the can cooker 10 is able to cook at one time depends on the size of the can cooker 10, as is well known to those skilled in the art. In a first embodiment, the diameter of the main body 11 is approximately ten inches, and the height of the main body 11 is approximately fourteen inches. However, the specific dimensions and relation thereof in no way limit the scope of the can cooker 10.

Once all the food to be cooked is loaded into the can cooker 10, a heat transfer liquid is added. The heat transfer liquid may be water, beer, soda, broth, oil, or any other liquid capable of transferring energy from the exterior of the can cooker 10 to the food inside the can cooker 10. After the heat transfer liquid is added, a gasket 25 may be placed around the outer lip 21 of the lid 20, and then the lid 20 is installed on the main body 11 and the latches 30 are closed to secure the lid 20 to the main body 11.

After the lid 20 has been secured to the main body 11, the can cooker 10 may be placed adjacent to a heat source, which may be concentrated toward the bottom portion 12 and/or part of the wall portion 13 adjacent the bottom portion 12. After the heat transfer liquid starts to boil, thereby steaming the contents of the can cooker 10, heat may be continually applied to the exterior of the can cooker 10 to maintain steam for approximately forty minutes, after which time the heat source maybe removed. The can cooker 10 may be allowed stand for approximately ten minutes after the heat has been removed during which time the lid 20 may be removed. After the contents have been allowed to rest for approximately 10 minutes the contents consumed. Alternatively, the lid 20 may remain in place while the contents is allowed to rest.

Shortly after the can cooker 10 has been placed adjacent the heat source, the user may remove the lid 20 to visually inspect the contents. Even if there is steam inside the main body 11 at this point, only a nominal amount will escape due to the neck portion 14 and the ample surface area provided thereby for condensation. In the illustrative embodiment of the can cooker 10, steam only exits the main body 11 after the internal pressure of the can cooker 10 has risen to approximately 2 pounds per square inch above atmospheric pressure. Accordingly, the can cooker 10 may be configured to function as a low pressure steam convection cooker. The can cooker 10 may be used on almost any heat source, including but not limited to a campfire, grill (gas or charcoal), turkey fryer/fish fryer burner, wood stove, indoor oven (gas, electric, ceramic top), portable camp stoves (propane, butane, etc.).

This encapsulated steam cooking environment may allow the can cooker 10 to cook a large amount of food in a relatively short period of time with a relatively small volume of liquid. For example, if the volume of the main body 11 is 4 gallons, a user employing the can cooker 10 can prepare as much as 15 ears of corn, 5 pounds of potatoes, 2 pounds of carrots, 1 head of cabbage, 2 onions, 1 pork loin, 4 chicken breasts, and 2 pounds of sausage in approximately one hour using as little as 12 ounces of liquid. The liquid used for heat transfer may be any liquid suitable for the particular application, including but not limited to beer, soft drinks, water, juice, broths, marinades, oil, and/or combinations thereof. Even though all the food within the can cooker 10 is cooked simultaneously, the steam cooking environment minimizes flavor mixing such that food retains its original colors, flavors, vitamins, textures, and nutrients (i.e., a carrot looks and tastes like a carrot after cooking even if cooked with disparate food within the can cooker 10).

It is contemplated that for some embodiments of the can cooker 10, the amount of liquid positioned within the main body 11 will influence cooking time required. For example, a user may introduce 48 ounces of liquid into the main body 11 and use a heat source of variable output, such as charcoal. In this example, the majority of the cooking may be performed in approximately the first 90 minutes of when the can cooker 11 is introduced to the heat source (e.g., when the coals are the hottest), but the heat source may continue to act upon the can cooker 10 without over cooking the food therein. Other volumes of liquid may be used, such as 72 ounces, without limitation.

In some applications it is desirable to place any vegetables on the bottom and meat on top, as in most methods of using the can cooker 10 the temperature near the neck portion 14 is actually gets hotter after a certain elapsed time on a heat source when using a relatively low heat source (e.g. a 9000 BTU burner on a medium setting). Once steam starts to exit the main body 11 via the vent 24, the position of the can cooker 10 and amount of heat may continue for approximately 40 minutes, or until all the contents are cooked appropriately. By placing the meat on top, the ease of checking for doneness is increased.

If the basket 50 is used, the basket 50 may be removed prior to removing the can cooker 10 from the heat source (e.g., 10 minutes after steam has started to exit the main body via the vent 24). Alternatively, items requiring a shorter cooking time may be added toward the end of the cooking cycle (e.g., the last 10 or 15 minutes).

After the contents have been adequately cooked and removed from the can cooker 10, the can cooker 10 may be easily cleaned. The user may add water until it is approximately 3 inches deep and secure the lid 20 on to the main body 11. The user may then place the can cooker 10 onto a heat source to again create a steam convection atmosphere within the can cooker 10. After steam has been exiting the vent 24 for approximately 15 minutes, the can cooker 10 may be removed from the heat source and allowed to cool. After it has cooled to the point that it may be safely handled, the water may be swirled around, agitated, and poured out. The can cooker 10 may then be wiped dry or allowed to air dry.

The above method of use is for illustrative purposes only, and by no means limits the scope of the can cooker 10. The can cooker 10 and the various elements thereof may be constructed of any material suitable for the specific application of the can cooker 10. For example, the can cooker 10 may be constructed of aluminum, aluminum alloys, steel, iron, stainless steel, or any other suitable material known to those skilled in the art in unitary or multi-piece designs.

Although the specific embodiments pictured and described herein pertain to a can cooker 10 having two semi-circular grate pieces 40 therein, the can cooker 10 may be configured with other orientations and/or with different quantities of the various elements having different shapes and/or orientations. Accordingly, the scope of the can cooker 10 is in no way limited by the specific shape and/or dimensions of the main body 11, whether the main body 11 is constructed of a single multiple piece design, and/or grate pieces 40 or the relative quantities and/or positions thereof.

The preceding constraints, examples, and configurations of any of the aspects of a can cooker 10 disclosed and described herein are for illustrative purposes only, and are in no way limiting to the scope of any of the systems and/or methods as disclosed and claimed herein unless so indicated in the following claims. Furthermore, the various features, functionalities, configurations, aspects, etc. disclosed or described herein may be implemented in conjunction with one another or independently from one another. Accordingly, the presence or absence of other subject matter that may be complementary to the present disclosure in no way limits the scope thereof unless so indicated in the following claims.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Having described the preferred embodiment, other features, advantages, and/or efficiencies of the can cooker 10 will undoubtedly occur to those versed in the art, as will numerous modifications and alterations of the disclosed embodiments and methods, all of which may be achieved without departing from the spirit and scope of the can cooker 10 as disclosed and claimed herein. It should be noted that the can cooker 10 is not limited to the specific embodiments pictured and described herein, but are intended to apply to all similar apparatuses for cooking food within a generally cylindrical container. Modifications and alterations from the described embodiments will occur to those skilled in the art without departure from the spirit and scope of the can cooker 10.

What is claimed is:

1. A cooker comprising:
   a. a main body, said main body comprising:
      i. a bottom portion;
      ii. a wall portion, wherein said wall portion is integrally formed with and connected to said bottom portion, and wherein said wall portion extends upward from said bottom portion;
      iii. a neck portion, wherein said neck portion is integrally formed with and connected to said wall portion, and wherein a periphery of said neck portion is less than a periphery of said wall portion; and
      iv. a lid ring, wherein said lid ring is connected to an uppermost surface of said neck portion;
   b. a lid, said lid comprising:
      i. an outer lip, wherein a periphery of said outer lip is greater than a periphery of said lid ring in said main body and fashioned to be engageable therewith;
      ii. a recessed portion, wherein said recessed portion is integrally formed with and connected to said outer lip, wherein said recessed portion is formed substantially as a short cylinder, and wherein said recessed portion is sized and shaped to seat within said neck portion adjacent said lid ring;
      iii. a handle, wherein said handle is affixed to an upper face of said recessed portion; and
      iv. at least one vent formed as an aperture;
   c. a plurality of handles affixed to said wall portion of said main body; and,
   d. a grate system having at least one grate piece, said at least one grate piece comprising:
      i. a periphery bar;
      ii. at least one cross bar, wherein each end of said at least one cross bar is connected to said periphery bar;
      iii. at least one supporting cross bar having at least one foot formed therein, wherein each end of said at least one cross bar is connected to said periphery bar
   e. a basket comprising:
      i. a basket lip formed around a top periphery of said basket, wherein said basket lip is configured to rest on said lid ring and support said basket thereby;
      ii. a basket handle pivotal with respect to said basket; and
      iii. a plurality of apertures formed in said basket.

2. The cooker according to claim 1 wherein said plurality of handles is further defined as consisting of two handles equally spaced about said periphery of said wall portion of said main body.

3. The cooker according to claim 1 wherein said main body is constructed from stainless steel.

4. The cooker according to claim 1 wherein said cooker further comprises a gasket fashioned to fit between said lid and said main body so as to create a seal there between.

5. The cooker according to claim 1 wherein an interior portion of said main body is formed with an interior coating.

6. The cooker according to claim 5 wherein said cooker further comprises a latch configured to secure a position of said lid to said main body.

7. The cooker according to claim 1 wherein an exterior portion of said main body is formed with an exterior coating.

8. The cooker according to claim 7 wherein said cooker further comprises a latch configured to secure a position of said lid to said main body.

9. The cooker according to claim 1 further comprising a strainer lid, wherein said strainer lid is formed with a plurality of apertures therein, and wherein said strainer lid and said lid are interchangeable.

10. A cooker comprising:
    a. a main body, said main body comprising:
       i. a bottom portion;
       ii. a wall portion, wherein said wall portion is integrally formed with and connected to said bottom portion, and wherein said wall portion extends upward from said bottom portion;
       iii. a neck portion, wherein said neck portion is integrally formed with and connected to said wall portion, and wherein a periphery of said neck portion is less than a periphery of said wall portion; and
       iv. a lid ring, wherein said lid ring is connected to an uppermost surface of said neck portion, and wherein said bottom portion, said wall portion, said neck portion, and said lid ring are seamlessly and integrally formed with one another;
b. a lid, said lid comprising:
   i. an outer lip, wherein a periphery of said outer lip is greater than a periphery of said lid ring in said main body and fashioned to be engageable therewith;
   ii. a recessed portion, wherein said recessed portion is integrally formed with and connected to said outer lip, wherein said recessed portion is formed substantially as a short cylinder, and wherein said recessed portion is sized and shaped to seat within said neck portion adjacent said lid ring;
   iii. a handle, wherein said handle is affixed to an upper face of said recessed portion; and
   iv. at least one vent formed as an aperture;
c. a plurality of handles affixed to said wall portion of said main body; and,
d. a grate system having at least one grate piece, said at least one grate piece comprising:
   i. a periphery bar;
   ii. at least one cross bar, wherein each end of said at least one cross bar is connected to said periphery bar;
   iii. at least one supporting cross bar having at least one foot formed therein, wherein each end of said at least one cross bar is connected to said periphery bar.

11. The cooker according to claim 10 wherein said plurality of latches is further defined as consisting of two latches equally spaced about said periphery of said wall portion of said main body.

12. The cooker according to claim 10 wherein said plurality of handles is further defined as consisting of two handles equally spaced about said periphery of said wall portion of said main body.

13. The cooker according to claim 10 wherein an interior portion of said main body is formed with an interior coating.

14. The cooker according to claim 10 wherein an exterior portion of said main body is formed with an exterior coating.

15. The cooker according to claim 10 wherein said main body is constructed from stainless steel.

16. The cooker according to claim 10 wherein said cooker further comprises a gasket fashioned to fit between said lid and said main body so as to create a seal there between.

17. The cooker according to claim 10 wherein said lid further comprises a plurality of vents formed as apertures.

18. The cooker according to claim 10 wherein said vent further comprises a lifting portion.

19. A cooker comprising:
a. a main body, said main body comprising:
   i. a bottom portion;
   ii. a wall portion, wherein said wall portion is integrally formed with and connected to said bottom portion, and wherein said wall portion extends upward from said bottom portion;
   iii. a neck portion, wherein said neck portion is integrally formed with and connected to said wall portion, and wherein said periphery of said neck portion is less than said periphery of said wall portion; and
   iv. a lid ring, wherein said lid ring is connected to an uppermost surface of said neck portion, and wherein said bottom portion, said wall portion, said neck portion, and said lid ring are seamlessly and integrally formed with one another;
b. a lid, said lid comprising:
   i. an outer lip, wherein said periphery of said outer lip is greater than said periphery of said lid ring in said main body and fashioned to be engageable therewith;
   ii. a recessed portion, wherein said recessed portion is integrally formed with and connected to said outer lip, wherein said recessed portion is formed substantially as a short cylinder, and wherein said recessed portion is sized and shaped to seat within said neck portion adjacent said lid ring;
   iii. a handle, wherein said handle is affixed to an upper face of said recessed portion; and
   iv. at least one vent formed as an aperture;
c. a plurality of handles affixed to said wall portion of said main body; and,
d. a grate system having at least one grate piece, said at least one grate piece comprising:
   i. a periphery bar;
   ii. at least one cross bar, wherein each end of said at least one cross bar is connected to said periphery bar;
   iii. at least one supporting cross bar having at least one foot formed therein, wherein each end of said at least one cross bar is connected to said periphery bar, and wherein said grate system ensures that solid material of a certain size that is positioned within said main body does not contact the interior surface of said bottom portion.

20. The cooker according to claim 19 wherein said solid material is food and introduction of a liquid into said cooker for use with an external heat source promotes cooking of said food by convection within said main body.

* * * * *